No. 835,937. PATENTED NOV. 13, 1906.
E. CARLSON.
HOOK.
APPLICATION FILED APR. 17, 1906.
Fig. 1.
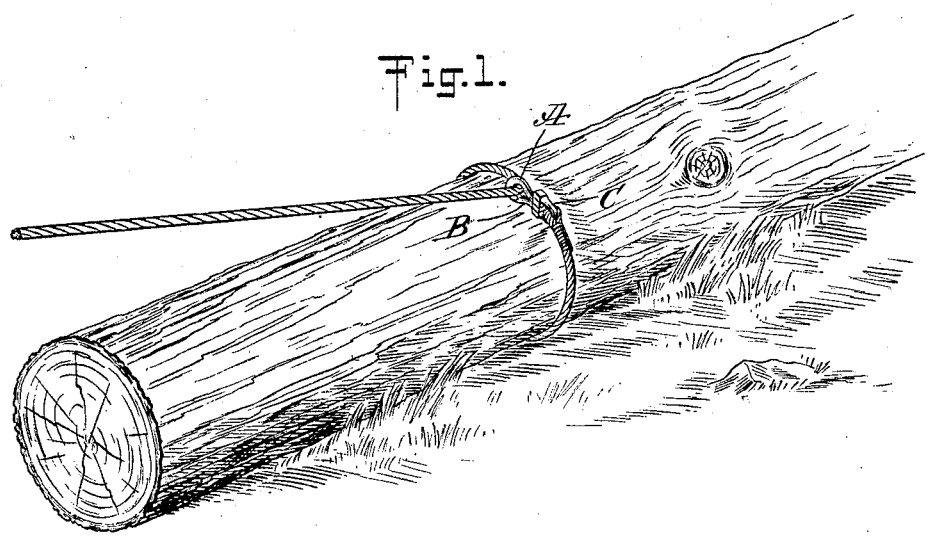
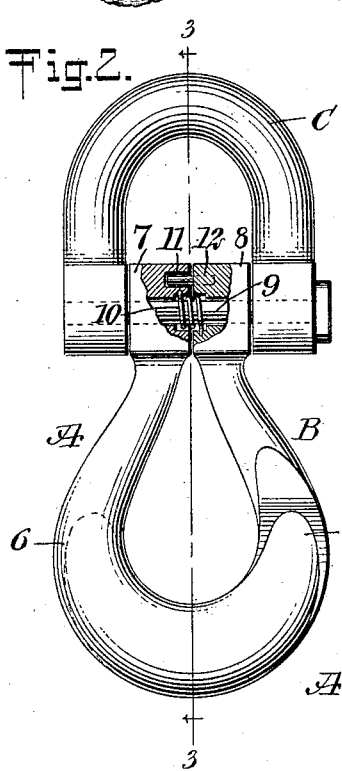
Fig. 2.
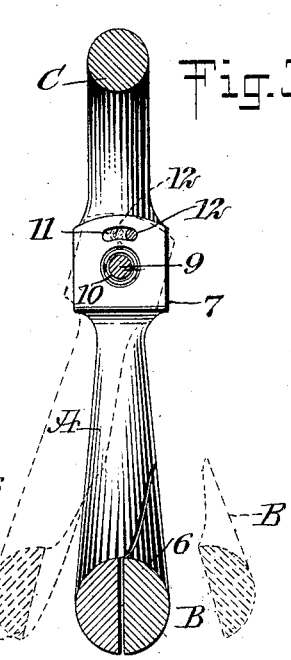
Fig. 3.
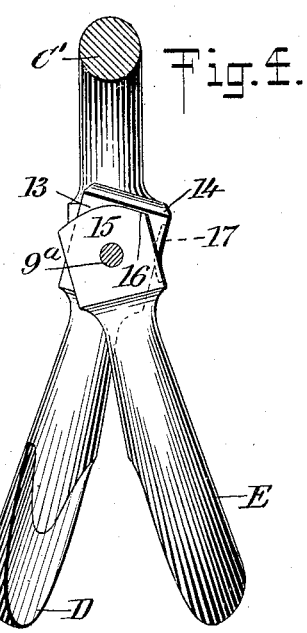
Fig. 4.
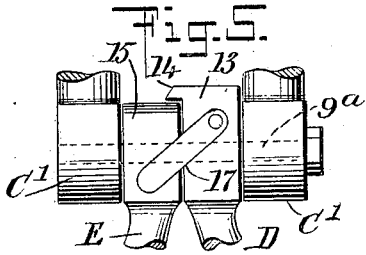
Fig. 5.
WITNESSES:
INVENTOR
Elias Carlson
BY Munn & Co
ATTORNEYS

UNITED STATES PATENT OFFICE.

ELIAS CARLSON, OF KALAMA, WASHINGTON.

HOOK.

No. 835,937.

Specification of Letters Patent.

Patented Nov. 13, 1906.

Application filed April 17, 1906. Serial No. 312,168.

*To all whom it may concern:*

Be it known that I, ELIAS CARLSON, a citizen of the United States, and a resident of Kalama, in the county of Cowlitz and State of Washington, have invented a new and Improved Hook, of which the following is a full, clear, and exact description.

My invention relates to improvements in hooks of the type adapted for use on cables and ropes, particularly in logging operations, seining, and the like.

One of the annoyances experienced when dragging a log by means of a cable attached thereto with the ordinary type of hook is the liability of the device being unhooked whenever the cable is slackened.

One of the principal objects of my invention is to provide a hook which cannot be accidentally unhooked, and to this end I employ a "two-part hook"—that is, a hook comprising two opposed and overlapping hook members so mounted that they can be swung apart to receive a cable, after which they may be closed about said cable. In order to prevent the possibility of the hook members swinging apart accidentally, it is an object of my invention to provide the hook with means adapted to hold the hook members normally in closed position.

Another object is to provide means for limiting the extent to which the two-hook members may be swung open.

The above and additional objects are attained by means of certain novel features of construction and arrangements of parts, which will be fully set forth hereinafter, and pointed out in the claims.

Reference is to be had to the accompanying drawings, forming a part of this specification, in which similar characters of reference indicate corresponding parts in all the figures.

Figure 1 is a perspective view showing my invention as used for fastening a cable to a log. Fig. 2 is a front view of my improved hook, partly broken away, to show details. Fig. 3 is a transverse sectional view substantially on the line 3 3 of Fig. 2, viewed in the direction of the arrows. Fig. 4 is an essentially similar view to Fig. 3, showing a modified form of the invention, partly broken away, exposing details, and Fig. 5 is a side view of a portion of the modified construction for the device shown in Fig. 4.

My improved hook comprises two hook members A and B, respectively, each member being formed with a curved claw 6, substantially of the form illustrated in the drawings, the hook member A having a head 7 and the hook member B having a head 8. The hook members are mounted to swing laterally—that is, at right angles to their planes—on a shaft or bolt 9, which passes through openings in the heads 7 and 8, and is secured in the ends of an inverted-U-shaped shackle C. The overlapping ends of the claws 6 are flattened and tapered at their adjacent sides in such manner that when the hook members are closed or swung together the ends will offer no projecting obstruction to the free movement of a cable within the closed hook. It will be evident that when the hook members are swung into closed position they provide a practically continuous closed ring.

In order to keep the hook members in closed position, a coil-spring 10 is mounted on the bolt 9 in an annular recess formed in the adjacent faces of the heads 7 and 8, and the ends of this coil-spring engage, resepectively, the heads 7 and 8, pressing the hook members A and B into closed position.

In order to limit the extent to which the hook may be opened, the head 7 of the hook member A is provided with a slot 11, and the head 8 is provided with a pin 12, entering this slot. The length of said slot 11 will thus determine the extent to which the hook members may be swung apart, as indicated by dotted lines in Fig. 3, the pin 12 being shown sectionally in its extreme position at the end of the slot 11.

A modification of my invention is shown in Figs. 4 and 5. Two hook members D and E are employed, of a form similar to those shown at A and B in Fig. 2, and mounted in similar manner on a shaft 9ª, passing through the ends of a shackle C'. On the member D a head 13 is provided, which is formed with a lip 14, overlapping a head 15 on the hook member E. The head 15 is provided with a flattened face 16, adapted to engage the lip 14 when the hook members are swung apart to the desired limit, thus preventing further opening of the hook. This limit may be varied by altering the inclination of the flattened face 16.

As a means for holding the two hook members normally in closed position, I provide a flat spring 17, which is secured to the upper part of the head 13 and projects at an angle with the axis of the hook members over the lower part of the head 15. This flat spring is preferably seated in a recess formed in the heads 15 and 13, respectively, as indicated by dotted lines in Fig. 4, thus offering no projection which might involve an entanglement with a cable or with any other obstruction.

A feature of my invention is the fact that the hook is free from any projecting parts which are liable to catch on brush or the like when used in logging operations. Another important feature of the invention is that the ends of the clevis or shackle C are on the outside of the hook, and thus do not interfere with the cable.

Having thus described my invention, I claim as new and desire to secure by Letters Patent—

1. A hook comprising a shackle, two hook members overlapping each other and mounted to rotate laterally toward and from each other on said shackle, means for limiting the arc through which said hook members may be mutually rotated, and means for holding said hook members in direct engagement with each other.

2. A hook comprising an inverted-U-shaped member, a shaft connecting the ends of said U-shaped member, two hook members mutually rotatable on said shaft, said hook members being formed with curved claws overlapping each other and lying in planes at right angles to the plane of rotation of said hook members, said claws being tapered at their adjacent sides, and a spring connected to said hook members and adapted to hold said claws in direct engagement with each other.

3. A hook comprising an inverted-U-shaped member, a shaft connecting the ends of said U-shaped member, two hook members mutually rotatable on said shaft, said hook members being formed with curved claws overlapping each other and lying in planes at right angles to the plane of rotation of said hook members, said claws being tapered at their adjacent sides, a pin in one of said hook members, and coacting surfaces in the other of said hook members adapted to engage said pin and limit the arc through which said members may be mutually rotated.

4. A hook comprising an inverted-U-shaped member, a shaft connecting the ends of said U-shaped member, two hook members mutually rotatable on said shaft, said hook members being formed with curved claws overlapping each other and lying in planes at right angles to the plane of rotation of said hook members, said claws being tapered at their adjacent sides, a spring connected to said hook members and adapted to hold said claws in direct engagement with each other, a pin in one of said hook members, and coacting surfaces on the other of said hook members adapted to engage said pin and limit the arc through which said members may be mutually rotated.

5. A hook comprising two hook members overlapping each other, each hook having a general plane, said hooks being mounted to rotate toward and from each other in a plane approximately at right angles to said general planes, and means for limiting the extent to which said members can be rotatably diverged.

6. A hook comprising two hook members overlapping each other, each hook member having a general plane, said members being mounted to turn toward and from each other on an axis approximately parallel with said general planes of said members, and means for holding said members normally in closed position.

7. A hook comprising two hook members overlapping each other, each hook member having a general plane, said members being mounted to turn toward and from each other on an axis approximately parallel with said general planes of said members, and means for holding said members in direct engagement with each other.

8. A hook comprising two hook members overlapping each other, each hook member having a general plane, said members being mounted to turn toward and from each other on an axis approximately parallel with said general planes of said members, means for limiting the arc through which said members can be mutually rotated, and means for holding said members normally in direct engagement with each other.

9. A hook comprising two hook members overlapping each other, each hook member having a general plane, said members being mounted to turn toward and from each other on an axis approximately parallel with said general planes of said members, a spring adapted to hold said members normally in closed position, and means for attaching said members to a cable.

10. A hook comprising two hook members overlapping each other, each hook member having a general plane, said hooks being mounted to turn toward and from each other on an axis approximately parallel with said general planes of said members, a spring adapted to hold said members normally in closed position, a pin carried by one of said members, surfaces on the other of said members adapted to engage said pin and limit the arc through which said members may be mutually rotated, and means for attaching said hook members to a cable.

11. A hook comprising two hook members overlapping each other, each hook member having a general plane, said hooks being mounted to turn toward and from each other on an axis approximately parallel with said general planes of said members, a pin carried by one of said members, surfaces on the other of said members adapted to engage said pin and limit the arc through which said members may be mutually rotated, and means for attaching said hook members to a cable.

In testimony whereof I have signed my name to this specification in the presence of two subscribing witnesses.

ELIAS CARLSON.

Witnesses:
 WILLIAM F. MAGILL,
 ELZA N. HOWE.